United States Patent [19]

Raith et al.

[11] Patent Number: 5,768,267
[45] Date of Patent: Jun. 16, 1998

[54] METHOD FOR SYSTEM REGISTRATION AND CELL RESELECTION

[75] Inventors: Alex Krister Raith, Durham; John Diachina, Garner; Raymond C. Henry, Wake Forest; Steven Prokup, Cary, all of N.C.; Lars Bilström, Solna; Karl-Erik Andersson, Stockholm, both of Sweden; Alan Eric Sicher, Garland, Tex.; Laura E. Bohaychuk, Apex, N.C.

[73] Assignee: Telefonaktiebolaget LM Ericsson, Stockholm, Sweden

[21] Appl. No.: 544,488

[22] Filed: Oct. 18, 1995

[51] Int. Cl.⁶ .................. H04Q 7/00; H04Q 7/22
[52] U.S. Cl. .................. 370/329; 370/337; 455/434; 455/435
[58] Field of Search .................. 370/326, 329, 370/337, 344, 349, 442, 331, 328, 345, 347, 436, 496, 522; 379/59, 60; 455/33.2, 422, 433, 434, 435, 450, 455, 464, 466

[56] References Cited

U.S. PATENT DOCUMENTS

| | | |
|---|---|---|
| 4,887,265 | 12/1989 | Felix . |
| 4,916,691 | 4/1990 | Goodman . |
| 5,119,397 | 6/1992 | Dahlin et al. . |
| 5,175,867 | 12/1992 | Wejke et al. . |
| 5,353,332 | 10/1994 | Raith et al. . |
| 5,502,721 | 3/1996 | Pohjakallio .................. 370/336 |
| 5,515,374 | 5/1996 | Atkinson .................. 370/433 |
| 5,530,693 | 6/1996 | Averbuch .................. 370/331 |
| 5,590,133 | 12/1996 | Billström .................. 370/349 |

FOREIGN PATENT DOCUMENTS

| | | |
|---|---|---|
| 332818 | 9/1989 | European Pat. Off. . |
| WO95/16330 | 6/1995 | WIPO . |
| WO95/28063 | 10/1995 | WIPO . |

OTHER PUBLICATIONS

"Cellular System Dual–Mode Mobile Station—Base Station Compatibility Standard", *EIA/TIA Interim Standard, IS–54–B*, pertinent pages only, Apr. 1992.

K. Felix, "Packet Switching in Digital Cellular Systems", *Proc. 38th IEEE Vehicular Technology Conf*, pp. 414–418, Jun. 1988.

P. Decker et al., "A General Packet Radio Service Proposed for GSM", *GSM in a Future Competitive Environment*, Helsinki, Finland, pp. 1–20, Oct. 13, 1993.

P. Decker, "Packet Radio in GSM", *European Telecommunications Standards Insitute (ETSI)*, T Doc SMG 4 58/93, pp. 1–13, (odd pages only), Feb. 12, 1993.

*Primary Examiner*—Wellington Chin
*Assistant Examiner*—Soon-Dong Hyun
*Attorney, Agent, or Firm*—Burns, Doane, Swecker & Mathis, L.L.P.

[57] ABSTRACT

A method for registering a mobile station when the mobile station first enters a communication system which supports packet data channels is disclosed. The mobile station receives system information broadcasted on a digital control channel. The mobile station is then assigned to a beacon packet data channel over which the mobile station registers with the communication system.

15 Claims, 8 Drawing Sheets

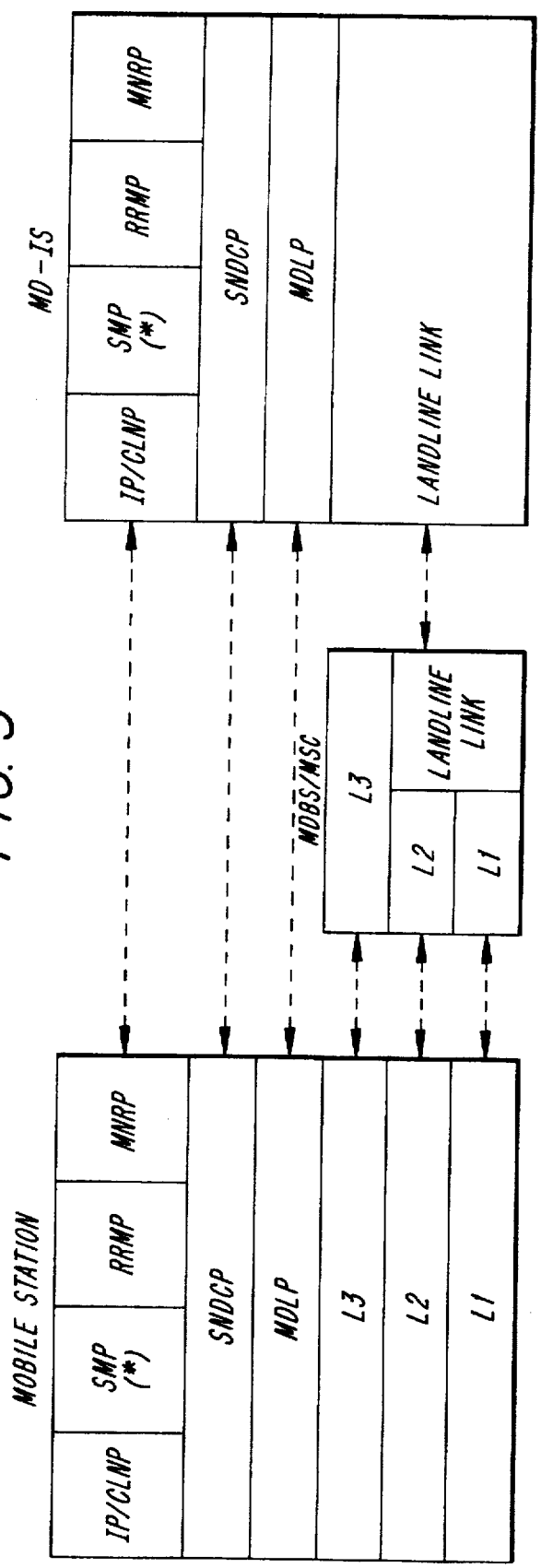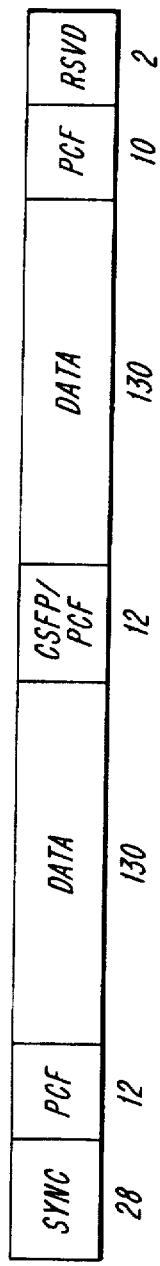
FIG. 5
FIG. 7

METHOD FOR SYSTEM REGISTRATION AND CELL RESELECTION

BACKGROUND

Applicants' invention relates to electrical telecommunication, and more particularly to wireless communication systems, such as cellular and satellite radio systems, for various modes of operation (analog, digital, dual mode, etc.), and access techniques such as frequency division multiple access (FDMA), time divisional multiple access (TDMA), code divisional multiple access (CDMA), hybrid FDMA/TDMA/CDMA, for example.

In North America, digital communication and multiple access techniques such as TDMA are currently provided by a digital cellular radiotelephone system called the digital advanced mobile phone service (D-AMPS), some of the characteristics of which are specified in the interim standard TIA/EIA/IS-54-B, "Dual-Mode Mobile Station-Base Station Compatibility Standard", published by the Telecommunications Industry Association and Electronic Industries Association (TIA/EIA), which is expressly incorporated herein by reference. Because of a large existing consumer base of equipment operating only in the analog domain with frequency-division multiple access (FDMA), TIA/EIA/IS-54-B is a dual-mode (analog and digital) standard, providing for analog compatibility together with digital communication capability. For example, the TIA/EIA/IS-54-B standard provides for both FDMA analog voice channels (AVC) and TDMA digital traffic channels (DTC). The AVCs and DTCs are implemented by frequency modulating radio carrier signals, which have frequencies near 800 megahertz (MHz) such that each radio channel has a spectral width of 30 kilohertz (KHz).

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user.

The successive time slots assigned to the same user, which are usually not consecutive time slots on the radio carrier, constitute the user's digital traffic channel, which may be considered a logical channel assigned to the user. As described in more detail below, digital control channels (DCCs) can also be provided for communicating control signals, and such a DCC is a logical channel formed by a succession of usually non-consecutive time slots on the radio carrier.

In only one of many possible embodiments of a TDMA system as described above, the TIA/EIA/IS-54-B standard provided that each TDMA frame consists of six consecutive time slots and has a duration of 40 milliseconds (msec). Thus, each radio channel can carry from three to six DTCs (e.g., three to six telephone conversations), depending on the source rates of the speech coder/decoders (codecs) used to digitally encode the conversations. Such speech codecs can operate at either full-rate or half-rate. A full-rate DTC requires twice as many time slots in a given time period as a half-rate DTC, and in TIA/EIA/IS-54-B, each full-rate DTC uses two slots of each TDMA frame, i.e., the first and fourth, second and fifth, or third and sixth of a TDMA frame's six slots. Each half-rate DTC uses one time slot of each TDMA frame. During each DTC time slot, 324 bits are transmitted, of which the major portion, 260 bits, is due to the speech output of the codec, including bits due to error correction coding of the speech output, and the remaining bits are used for guard times and overhead signalling for purposes such as synchronization.

It can be seen that the TDMA cellular system operates in a buffer-and-burst, or discontinuous-transmission, mode: each mobile station transmits (and receives) only during its assigned time slots. At full rate, for example, a mobile station might transmit during slot 1, receive during slot 2, idle during slot 3, transmit during slot 4, receive during slot 5, and idle during slot 6, and then repeat the cycle during succeeding TDMA frames. Therefore, the mobile station, which may be battery-powered, can be switched off, or sleep, to save power during the time slots when it is neither transmitting nor receiving.

In addition to voice or traffic channels, cellular radio communication systems also provide paging/access, or control, channels for carrying call-setup messages between base stations and mobile stations. According to TIA/EIA/IS-54-B, for example, there are twenty-one dedicated analog control channels (ACCs), which have predetermined fixed frequencies for transmission and reception located near 800 MHz. Since these ACCs are always found at the same frequencies, they can be readily located and monitored by the mobile stations.

For example, when in an idle state (i.e., switched on but not making or receiving a call), a mobile station in a TIA/EIA/IS-54-B system tunes to and then regularly monitors the strongest control channel (generally, the control channel of the cell in which the mobile station is located at that moment) and may receive or initiate a call through the corresponding base station. When moving between cells while in the idle state, the mobile station will eventually "lose" radio connection on the control channel of the "old" cell and tune to the control channel of the "new" cell. The initial tuning and subsequent re-tuning to control channels are both accomplished automatically by scanning all the available control channels at their known frequencies to find the "best" control channel. When a control channel with good reception quality is found, the mobile station remains tuned to this channel until the quality deteriorates again. In this way, mobile stations stay "in touch" with the system.

While in the idle state, a mobile station must monitor the control channel for paging messages addressed to it. For example, when an ordinary telephone (land-line) subscriber calls a mobile subscriber, the call is directed from the public switched telephone network (PSTN) to a mobile switching center (MSC) that analyzes the dialed number. If the dialed number is validated, the MSC requests some or all of a number of radio base stations to page the called mobile station by transmitting over their respective control channels paging messages that contain the mobile identification number (MIN) of the called mobile station. Each idle mobile station receiving a paging message compares the received MIN with its own stored MIN. The mobile station with the matching stored MIN transmits a page response over the particular control channel to the base station, which forwards the page response to the MSC.

Upon receiving the page response, the MSC selects an AVC or a DTC available to the base station that received the page response, switches on a corresponding radio transceiver in that base station, and causes that base station to send a message via the control channel to the called mobile station that instructs the called mobile station to tune to the selected voice or traffic channel. A through-connection for the call is established once the mobile station has tuned to the selected AVC or DTC.

The performance of the system having ACCs that is specified by TIA/EIA/IS-54-B has been improved in a system having digital control channels (DCCs) that is specified in TIA/EIA/IS-136, which is expressly incorporated herein by reference. One example of such a system having DCCs with new formats and processes is described in U.S. patent application Ser. No. 07/956,640 entitled "Digital Control Channel", which was filed on Oct. 5, 1992, and which is incorporated in this application by reference. Using such DCCs, each TIA/EIA/IS-54-B radio channel can carry DTCs only, DCCs only, or a mixture of both DTCs and DCCs. Within the TIA/EIA/IS-136-B framework, each radio carrier frequency can have up to three full-rate DTCs/DCCs, or six half-rate DTCs/DCCs, or any combination in between, for example, one full-rate and four half-rate DTCs/DCCs.

In general, however, the transmission rate of the DCC need not coincide with the half-rate and full-rate specified in TIA/EIA/IS-54-B, and the length of the DCC slots may not be uniform and may not coincide with the length of the DTC slots. The DCC may be defined on an TIA/EIA/IS-54-B radio channel and may consist, for example, of every n-th slot in the stream of consecutive TDMA slots. In this case, the length of each DCC slot may or may not be equal to 6.67 msec, which is the length of a DTC slot according to TIA/EIA/IS-54-B. Alternatively (and without limitation on other possible alternatives), these DCC slots may be defined in other ways known to one skilled in the art.

In cellular telephone systems, an air link protocol is required in order to allow a mobile station to communicate with the base stations and MSC. The communications link protocol is used to initiate and to receive cellular telephone calls. As described in U.S. patent application Ser. No. 08/477,574 entitled "Layer 2 Protocol for the Random Access Channel and the Access Response Channel," which was filed on Jun. 7, 1995, and which is incorporated in this application by reference, the communications link protocol is commonly referred to within the communications industry as a Layer 2 protocol, and its functionality includes the delimiting, or framing, of Layer 3 messages. These Layer 3 messages may be sent between communicating Layer 3 peer entities residing within mobile stations and cellular switching systems. The physical layer (Layer 1) defines the parameters of the physical communications channel, e.g., radio frequency spacing, modulation characteristics, etc. Layer 2 defines the techniques necessary for the accurate transmission of information within the constraints of the physical channel, e.g., error correction and detection, etc. Layer 3 defines the procedures for reception and processing of information transmitted over the physical channel.

Communications between mobile stations and the cellular switching system (the base stations and the MSC) can be described in general with reference to FIGS. 1 and 2. FIG. 1 schematically illustrates pluralities of Layer 3 messages 11, Layer 2 frames 13, and Layer 1 channel bursts, or time slots, 15. In FIG. 1, each group of channel bursts corresponding to each Layer 3 message may constitute a logical channel, and as described above, the channel bursts for a given Layer 3 message would usually not be consecutive slots on an TIA/EIA/136 carrier. On the other hand, the channel bursts could be consecutive; as soon as one time slot ends, the next time slot could begin.

Each Layer 1 channel burst 15 contains a complete Layer 2 frame as well as other information such as, for example, error correction information and other overhead information used for Layer 1 operation. Each Layer 2 frame contains at least a portion of a Layer 3 message as well as overhead information used for Layer 2 operation. Although not indicated in FIG. 1, each Layer 3 message would include various information elements that can be considered the payload of the message, a header portion for identifying the respective message's type, and possibly padding.

Each Layer 1 burst and each Layer 2 frame is divided into a plurality of different fields. In particular, a limited-length DATA field in each Layer 2 frame contains the Layer 3 message 11. Since Layer 3 messages have variable lengths depending upon the amount of information contained in the Layer 3 message, a plurality of Layer 2 frames may be needed for transmission of a single Layer 3 message. As a result, a plurality of Layer 1 channel bursts may also be needed to transmit the entire Layer 3 message as there is a one-to-one correspondence between channel bursts and Layer 2 frames.

As noted above, when more than one channel burst is required to send a Layer 3 message, the several bursts are not usually consecutive bursts on the radio channel. Moreover, the several bursts are not even usually successive bursts devoted to the particular logical channel used for carrying the Layer 3 message. Since time is required to receive, process, and react to each received burst, the bursts required for transmission of a Layer 3 message are usually sent in a staggered format, as schematically illustrated in FIG. 2(a) and as described above in connection with the TIA/EIA/IS-136 standard.

FIG. 2(a) shows a general example of a forward (or downlink) DCC configured as a succession of time slots 1, 2, ..., N, ... included in the consecutive time slots 1, 2, ... sent on a carrier frequency. These DCC slots may be defined on a radio channel such as that specified by TIA/EIA/IS-136, and may consist, as seen in FIG. 2(a) for example, of every n-th slot in a series of consecutive slots. Each DCC slot has a duration that may or may not be 6.67 msec, which is the length of a DTC slot according to the TIA/EIA/IS-136 standard.

As shown in FIG. 2(a), the DCC slots may be organized into superframes (SF), and each superframe includes a number of logical channels that carry different kinds of information. One or more DCC slots may be allocated to each logical channel in the superframe. The exemplary downlink superframe in FIG. 2(a) includes three logical channels: a broadcast control channel (BCCH) including six successive slots for overhead messages; a paging channel (PCH) including one slot for paging messages; and an access response channel (ARCH) including one slot for channel assignment and other messages. The remaining time slots in the exemplary superframe of FIG. 2 may be dedicated to other logical channels, such as additional paging channels PCH or other channels. Since the number of mobile stations is usually much greater than the number of slots in the superframe, each paging slot is used for paging several mobile stations that share some unique characteristic, e.g., the last digit of the MIN.

FIG. 2(b) illustrates a preferred information format for the slots of a forward DCC. FIG. 2(b) indicates the number of bits in each field above that field. The bits sent in the SYNC information are used in a conventional way to help ensure accurate reception of the CSFP and DATA fields. The SYNC information carries a predetermined bit pattern used by the base stations to find the start of the slot. The SCF information is used to control a random access channel (RACH), which is used by the mobile to request access to the system. The CSFP information conveys a coded superframe phase value that enables the mobile stations to find the start of each superframe. This is just one example for the information format in the slots of the forward DCC.

For purposes of efficient sleep mode operation and fast cell selection, the BCCH may be divided into a number of sub-channels. U.S. patent application Ser. No. 07/956,640 discloses a BCCH structure that allows the mobile station to read a minimum amount of information when it is switched on (when it locks onto a DCC) before being able to access the system (place or receive a call). After being switched on, an idle mobile station needs to regularly monitor only its assigned PCH slots (usually one in each superframe); the mobile can sleep during other slots. The ratio of the mobile's time spent reading paging messages and its time spent asleep is controllable and represents a tradeoff between call-set-up delay and power consumption.

Since each TDMA time slot has a certain fixed information carrying capacity, each burst typically carries only a portion of a Layer 3 message as noted above. In the uplink direction, multiple mobile stations attempt to communicate with the system on a contention basis, while multiple mobile stations listen for Layer 3 messages sent from the system in the downlink direction. In known systems, any given Layer 3 message must be carried using as many TDMA channel bursts as required to send the entire Layer 3 message.

Digital control and traffic channels are desirable for these and other reasons described in U.S. patent application Ser. No. 08/147,254, entitled "A Method for Communicating in a Wireless Communication System", which was filed on Nov. 1, 1993, and which is incorporated in this application by reference. For example, they support longer sleep periods for the mobile units, which results in longer battery life.

Digital traffic channels and digital control channels have expanded functionality for optimizing system capacity and supporting hierarchical cell structures, i.e., structures of macrocells, microcells, picocells, etc. The term "macrocell" generally refers to a cell having a size comparable to the sizes of cells in a conventional cellular telephone system (e.g., a radius of at least about 1 kilometer), and the terms "microcell" and "picocell" generally refer to progressively smaller cells. For example, a microcell might cover a public indoor or outdoor area, e.g., a convention center or a busy street, and a picocell might cover an office corridor or a floor of a high-rise building. From a radio coverage perspective, macrocells, microcells, and picocells may be distinct from one another or may overlap one another to handle different traffic patterns or radio environments.

FIG. 3 is an exemplary hierarchical, or multi-layered, cellular system. An umbrella macrocell 10 represented by a hexagonal shape makes up an overlying cellular structure. Each umbrella cell may contain an underlying microcell structure. The umbrella cell 10 includes microcell 20 represented by the area enclosed within the dotted line and microcell 30 represented by the area enclosed within the dashed line corresponding to areas along city streets, and picocells 40, 50, and 60, which cover individual floors of a building. The intersection of the two city streets covered by the microcells 20 and 30 may be an area of dense traffic concentration, and thus might represent a hot spot.

FIG. 4 represents a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by the above-cited U.S. patent applications and by U.S. Pat. No. 5,175,867 to Wejke et al., entitled "Neighbor-Assisted Handoff in a Cellular Communication System," and U.S. patent application Ser. No. 07/967,027 entitled "Multi-mode Signal Processing," which was filed on Oct. 27, 1992, both of which are incorporated in this application by reference.

The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the voice and control transceiver 170, for use with DCCs and DTCs that share the same radio carrier frequency.

The mobile station 120 receives the information broadcast on a control channel at its voice and control channel transceiver 170. Then, the processing unit 180 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332 to Raith et al., entitled "Method and Apparatus for Communication Control in a Radiotelephone System," which is incorporated in this application by reference.

To increase the user's "talk time", i.e., the battery life of the mobile station, U.S. patent application Ser. No. 07/956, 640 discloses a digital forward control channel (base station to mobile station) that can carry the types of messages specified for current analog forward control channels (FOCCs), but in a format which allows an idle mobile station to read overhead messages when locking onto the FOCC and thereafter only when the information has changed; the mobile sleeps at all other times. In such a system, some types of messages are broadcast by the base stations more frequently than other types, and mobile stations need not read every message broadcast.

The systems specified by the TIA/EIA/IS-54-B and TIA/EIA/IS-136 standards are circuit-switched technology, which is a type of "connection-oriented" communication that establishes a physical call connection and maintains that connection for as long as the communicating end-systems have data to exchange. The direct connection of a circuit switch serves as an open pipeline, permitting the end-systems to use the circuit for whatever they deem appropriate. While circuit-switched data communication may be well suited to constant-bandwidth applications, it is relatively inefficient for low-bandwidth and "bursty" applications.

Packet-switched technology, which may be connection-oriented (e.g., X.25) or "connectionless" (e.g., the Internet Protocol, "IP"), does not require the set-up and tear-down of a physical connection, which is in marked contrast to circuit-switched technology. This reduces the data latency and increases the efficiency of a channel in handling relatively short, bursty, or interactive transactions. A connectionless packet-switched network distributes the routing functions to multiple routing sites, thereby avoiding possible traffic bottlenecks that could occur when using a central switching hub. Data is "packetized" with the appropriate end-system addressing and then transmitted in independent units along the data path. Intermediate systems, sometimes called "routers", stationed between the communicating end-systems make decisions about the most appropriate route to take on a per packet basis. Routing decisions are based on a number of characteristics, including: least-cost route or cost metric; capacity of the link; number of packets waiting for transmission; security requirements for the link; and intermediate system (node) operational status.

Packet transmission along a route that takes into consideration path metrics, as opposed to a single circuit set up, offers application and communications flexibility. It is also how most standard local area networks (LANs) and wide area networks (WANs) have evolved in the corporate environment. Packet switching is appropriate for data communications because many of the applications and devices used, such as keyboard terminals, are interactive and transmit data in bursts. Instead of a channel being idle while a user inputs more data into the terminal or pauses to think about a problem, packet switching interleaves multiple transmissions from several terminals onto the channel.

Packet data provides more network robustness due to path independence and the routers' ability to select alternative paths in the event of network node failure. Packet switching, therefore, allows for more efficient use of the network lines. Packet technology offers the option of billing the end user based on amount of data transmitted instead of connection time. If the end user's application has been designed to make efficient use of the air link, then the number of packets transmitted will be minimal. If each individual user's traffic is held to a minimum, then the service provider has effectively increased network capacity.

Packet networks are usually designed and based on industry-wide data standards such as the open system interface (OSI) model or the TCP/IP protocol stack. These standards have been developed, whether formally or de facto, for many years, and the applications that use these protocols are readily available. The main objective of standards-based networks is to achieve interconnectivity with other networks. The Internet is today's most obvious example of such a standards-based network pursuit of this goal.

Packet networks, like the Internet or a corporate LAN, are integral parts of today's business and communications environments. As mobile computing becomes pervasive in these environments, wireless service providers such as those using TIA/EIA/IS-136 are best positioned to provide access to these networks. Nevertheless, the data services provided by or proposed for cellular systems are generally based on the circuit-switched mode of operation, using a dedicated radio channel for each active mobile user.

FIG. 5 shows representative architecture used for communicating across an air link that comprises the protocols which provide connectivity between a mobile end system (M-ES), a mobile data base station (MDBS), and a mobile data intermediate system (MD-IS). An exemplary description of the elements in FIG. 5 and a recommended approach for each element when considering alternative RF technologies follows.

The Internet Protocol/Connectionless Network Protocol (IP/CLNP) are network protocols that are connectionless and widely supported throughout the traditional data network community. These protocols are independent of the physical layer and preferably are not modified as the RF technologies change.

The Security Management Protocol (SMP) provides security services across the air link interface. The services furnished include data link confidentiality, M-ES authentication, key management, access control, and algorithm upgradability/replacement. The SMP should remain unchanged when implementing alternative RF technologies.

The Radio Resource Management Protocol (RRMP) provides management and control over the mobile unit's use of the RF resources. The RRMP and its associated procedures are specific to the AMPS RF infrastructure and require change based on the RF technology implemented.

The Mobile Network Registration Protocol (MNRP) is used in tandem with a Mobile Network Location Protocol (MNLP) to allow proper registration and authentication of the mobile end system. The MNRP should be unchanged when using alternative RF technologies.

The Mobile Data Link Protocol (MDLP) provides efficient data transfer between the MD-IS and the M-ES. The MDLP supports efficient mobile system movement, mobile system power conservation, RF channel resources sharing, and efficient error recovery. The MDLP should be unchanged when using alternative RF technologies.

The Medium Access Control (MAC) protocol and associated procedures control the methodology M-ESs use to manage shared access to the RF channel. This protocol and its functionality must be supplied by alternative RF technologies.

Modulation and encoding schemes are used at the physical layer. These schemes are specific to the RF technology employed, and therefore should be replaced with schemes appropriate for the alternative RF technology. The adoption of alternative RF technologies can be implemented with a minimum amount of change to the CDPD system architecture. The required changes are limited to the radio resource management protocol, the MAC, and physical layers; all other network services and support services remain unchanged.

A few exceptions to data services for cellular systems based on the circuit-switched mode of operation are described in the following documents, which include the packet data concepts.

U.S. Pat. No. 4,887,265 and "Packet Switching in Digital Cellular Systems", *Proc. 38th IEEE Vehicular Technology Conf.*, pp. 414–418 (June 1988) describe a cellular system providing shared packet data radio channels, each one capable of accommodating multiple data calls. A mobile station requesting packet data service is assigned to a particular packet data channel using essentially regular cellular signalling. The system may include packet access points (PAPS) for interfacing with packet data networks. Each packet data radio channel is connected to one particular PAP and is thus capable of multiplexing data calls associated with that PAP. Handovers are initiated by the system in a manner that is largely similar to the handover used in the same system for voice calls. A new type of handover is added for those situations when the capacity of a packet channel is insufficient.

These documents are data-call oriented and based on using system-initiated handover in a similar way as for regular voice calls. Applying these principles for providing general purpose packet data services in a TDMA cellular system would result in spectrum-efficiency and performance disadvantages.

U.S. Pat. No. 4,916,691 describes a new packet mode cellular radio system architecture and a new procedure for routing (voice and/or data) packets to a mobile station. Base stations, public switches via trunk interface units, and a cellular control unit are linked together via a WAN. The routing procedure is based on mobile-station-initiated handovers and on adding to the header of any packet transmitted from a mobile station (during a call) an identifier of the base station through which the packet passes. In case of an extended period of time between subsequent user information packets from a mobile station, the mobile station may transmit extra control packets for the purpose of conveying cell location information.

The cellular control unit is primarily involved at call establishment, when it assigns to the call a call control number. It then notifies the mobile station of the call control number and the trunk interface unit of the call control number and the identifier of the initial base station. During a call, packets are then routed directly between the trunk interface unit and the currently serving base station.

The system described in U.S. Pat. No. 4,916,691 is not directly related to the specific problems of providing packet data services in TDMA cellular systems.

"Packet Radio in GSM", European Telecommunications Standards Institute (ETSI) T Doc SMG 4 58/93 (Feb. 12, 1993) and "A General Packet Radio Service Proposed for GSM" presented during a seminar entitled "GSM in a Future Competitive Environment", Helsinki, Finland (Oct. 13, 1993) outline a possible packet access protocol for voice and data in GSM. These documents directly relate to TDMA cellular systems, i.e., GSM, and although they outline a possible organization of an optimized shared packet data channel, they do not deal with the aspects of integrating packet data channels in a total system solution.

"Packet Data over GSM Network", T Doc SMG 1 238/93, ETSI (Sep. 28, 1993) describes a concept of providing packet data services in GSM based on first using regular GSM signalling and authentication to establish a virtual channel between a packet mobile station and an "agent" handling access to packet data services. With regular signalling modified for fast channel setup and release, regular traffic channels are then used for packet transfer. This document directly relates to TDMA cellular systems, but since the concept is based on using a "fast switching" version of existing GSM traffic channels, it has disadvantages in terms of spectrum efficiency and packet transfer delays (especially for short messages) compared to a concept based on optimized shared packet data channels.

Cellular Digital Packet Data (CDPD) System Specification, Release 1.0 (Jul. 1993), which is expressly incorporated herein by reference, describes a concept for providing packet data services that utilizes available radio channels on current Advanced Mobile Phone Service (AMPS) systems, i.e., the North American analog cellular system. CDPD is a comprehensive, open specification endorsed by a group of U.S. cellular operators. Items covered include external interfaces, air link interfaces, services, network architecture, network management, and administration.

The specified CDPD system is to a large extent based on an infrastructure that is independent of the existing AMPS infrastructure. Commonalities with AMPS systems are limited to utilization of the same type of radio frequency channels and the same base station sites (the base station used by CDPD may be new and CDPD specific) and employment of a signalling interface for coordinating channel assignments between the two systems.

Routing a packet to a mobile station is based on, first, routing the packet to a home network node (home Mobile Data Intermediate System, MD-IS) equipped with a home location register (HLR) based on the mobile station address; then, when necessary, routing the packet to a visited, serving MD-IS based on HLR information; and finally transferring the packet from the serving MD-IS via the current base station, based on the mobile station reporting its cell location to its serving MD-IS.

Although the CDPD System Specification is not directly related to the specific problems of providing packet data services in TDMA cellular systems that are addressed by this application, the network aspects and concepts described in the CDPD System Specification can be used as a basis for the network aspects needed for an air link protocol in accordance with this invention.

The CDPD network is designed to be an extension of existing data communications networks and the AMPS cellular network. Existing connectionless network protocols may be used to access the CDPD network. Since the network is always considered to be evolving, it uses an open network design that allows the addition of new network layer protocols when appropriate. The CDPD network services and protocols are limited to the Network Layer of the OSI model and below. Doing so allows upper-layer protocols and applications development without changing the underlying CDPD network.

From the mobile subscriber's perspective, the CDPD network is a wireless mobile extension of traditional networks, both data and voice. By using a CDPD service provider network's service, the subscriber is able seamlessly to access data applications, many of which may reside on traditional data networks. The CDPD system may be viewed as two interrelated service sets: CDPD network support services and CDPD network services.

CDPD network support services perform duties necessary to maintain and administer the CDPD network. These services are: accounting server; network management system; message transfer server; and authentication server. These services are defined to permit interoperability among service providers. As the CDPD network evolves technically beyond its original AMPS infrastructure, it is anticipated that the support services shall remain unchanged. The functions of network support services are necessary for any mobile network and are independent of radio frequency (RF) technology.

CDPD network services are data transfer services that allow subscribers to communicate with data applications. Additionally, one or both ends of the data communications may be mobile.

To summarize, there is a need for a system providing general purpose packet data services in D-AMPS cellular systems, based on providing shared packet-data channels optimized for packet data. This application is directed to systems and methods that provide the combined advantages of a connection-oriented network like that specified by the TIA/EIA/IS-136 standard and a connectionless, packet data network. Furthermore, the present invention is directed to accessing the CDPD network, for example, by existing connectionless network protocols with low complexity and high throughput.

SUMMARY

Applicants' invention is directed to providing techniques for maximizing the communication between base stations and network entities using various connection oriented protocols.

According to one embodiment of the present invention, a method for registering a mobile station when the mobile station first enters a communication system which supports packet data channels is disclosed. The mobile station receives system information broadcasted on a digital control channel. The mobile station is then assigned to a beacon packet data channel over which the mobile station registers with the communication system.

According to another embodiment of the present invention, a cell reselection method for a mobile station operating in a communication system which supports packet data channels is disclosed. The mobile station receives system information broadcasted on a digital control channel. The mobile station is then assigned to a beacon packet data channel over which the mobile station registers with the communication system. The mobile station measures the signal strength of digital control channels of neighboring cells listed on a neighbor list included in the system information as well as the signal strength of the channel the mobile station is currently camping on. The mobile station can then decide to switch to a digital control channel of a neighboring cell, e.g., when the signal strength of the neighboring digital control channel is higher than the signal strength of the first digital control channel. Furthermore, each packet data channel can provide an indication to mobile stations which neighboring cells support packet data channels.

BRIEF DESCRIPTION OF THE DRAWINGS

The features and advantages of Applicants' invention will be understood by reading this description in conjunction with the drawings in which:

FIG. 5 shows a protocol architecture for communicating across an air link;

FIG. 7 illustrates an example of a slot format for BM1→M5 on PDCH;

DETAILED DESCRIPTION

Figure 1:
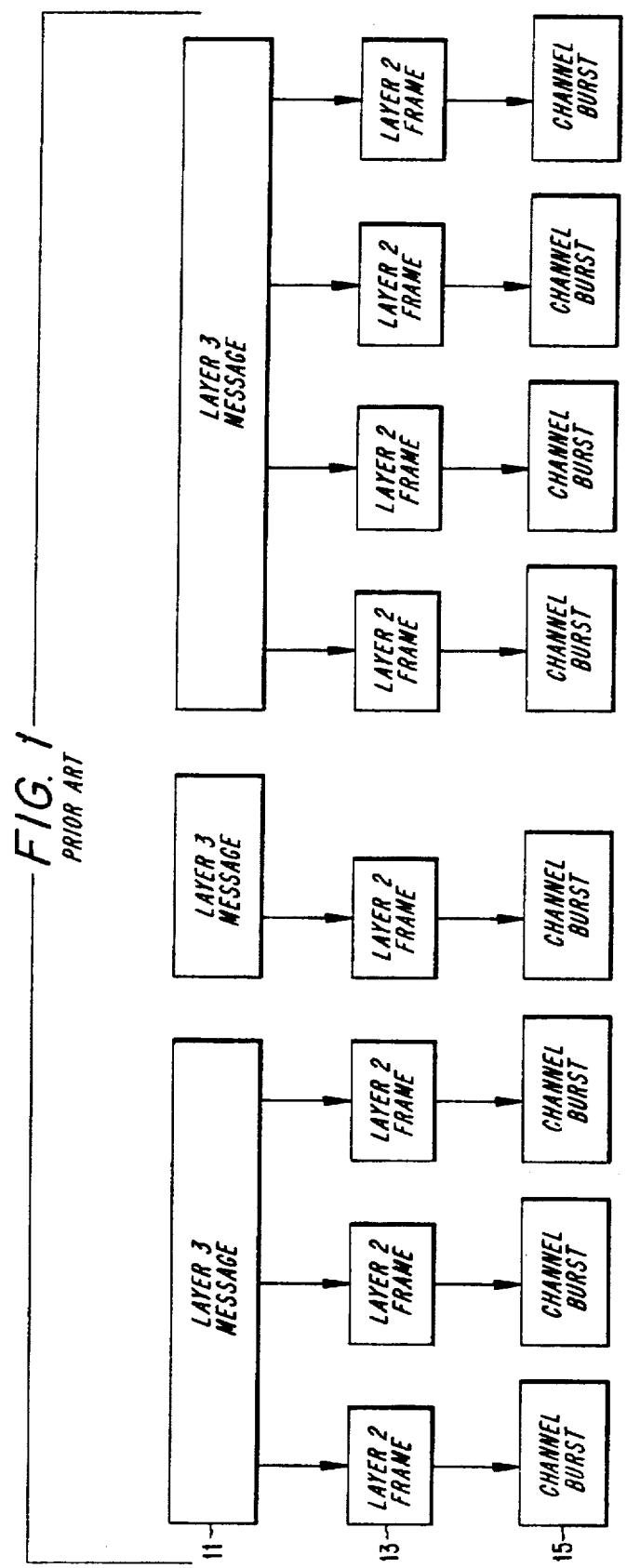
FIG. 1 schematically illustrates pluralities of Layer 3 messages, Layer 2 frames, and Layer 1 channel bursts, or time slots.
Figure 2:
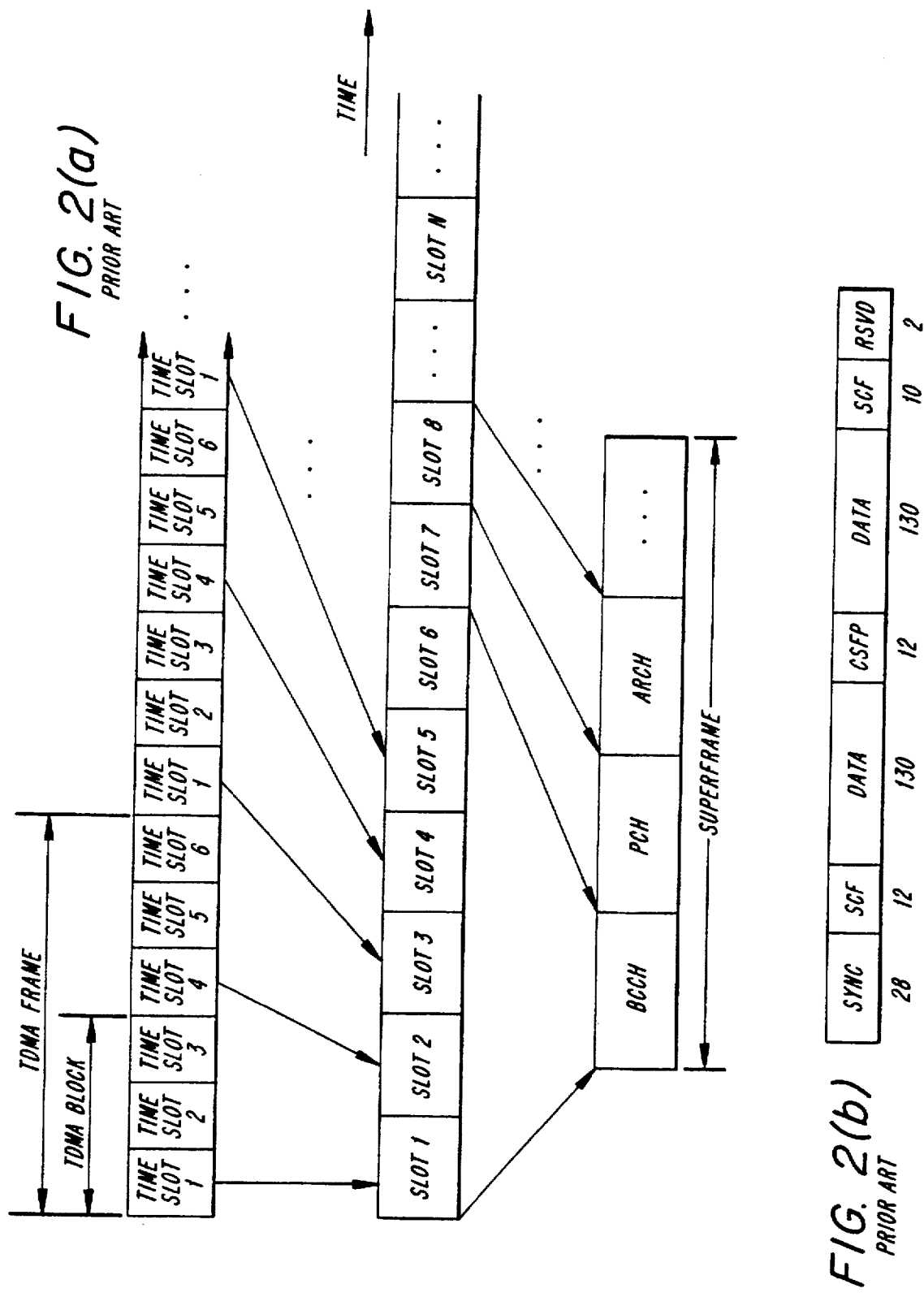
FIG. 2(a) shows a forward DCC configured as a succession of time slots included in the consecutive time slots sent on a carrier frequency.
FIG. 2(b) shows an example of an IS-136 DCCH field slot format.
Figure 3:
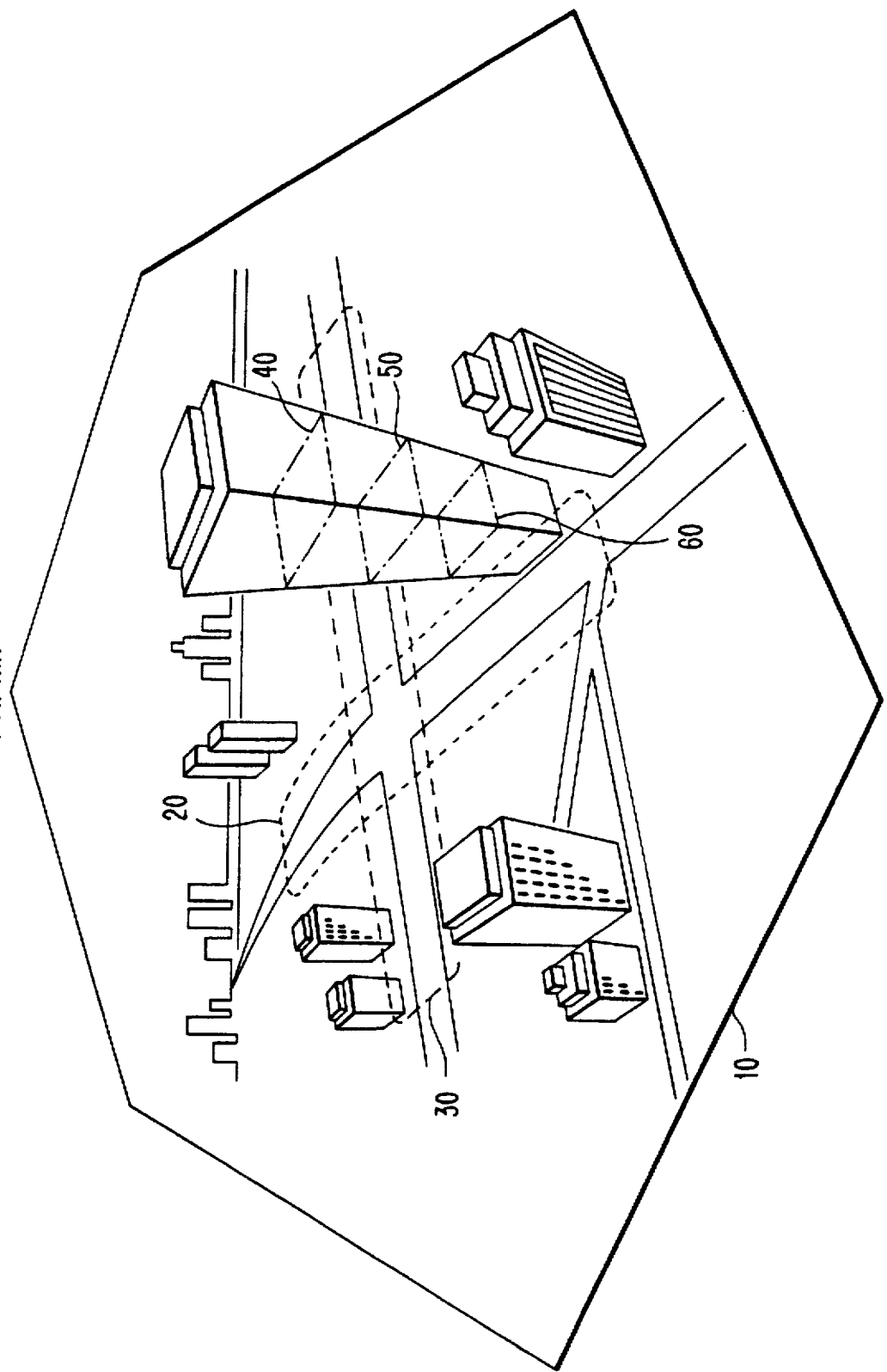
FIG. 3 illustrates an exemplary hierarchical, or multi-layered, cellular system.
Figure 4:
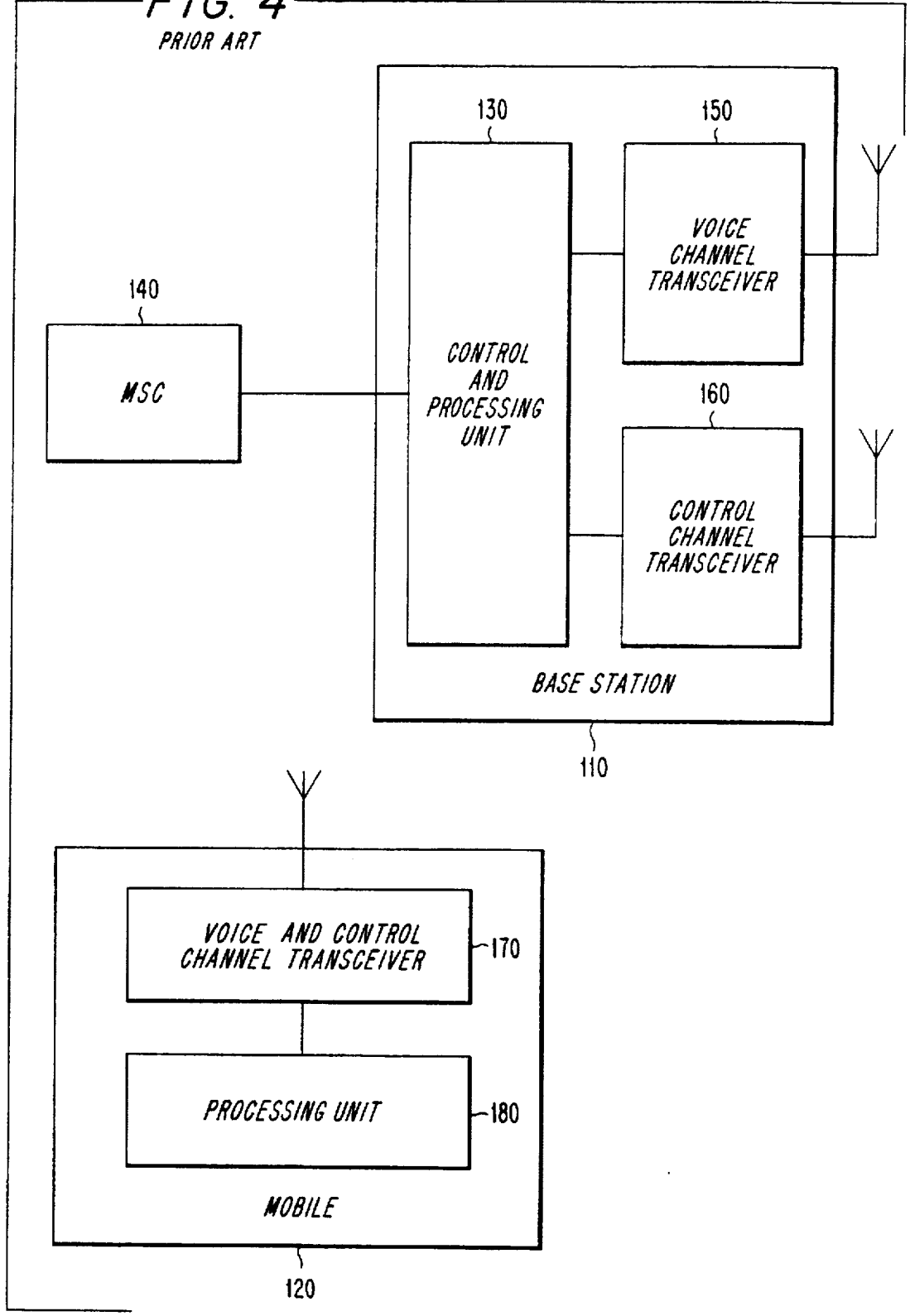
FIG. 4 is a block diagram of an exemplary cellular mobile radiotelephone system, including an exemplary base station and mobile station.
Figure 6:
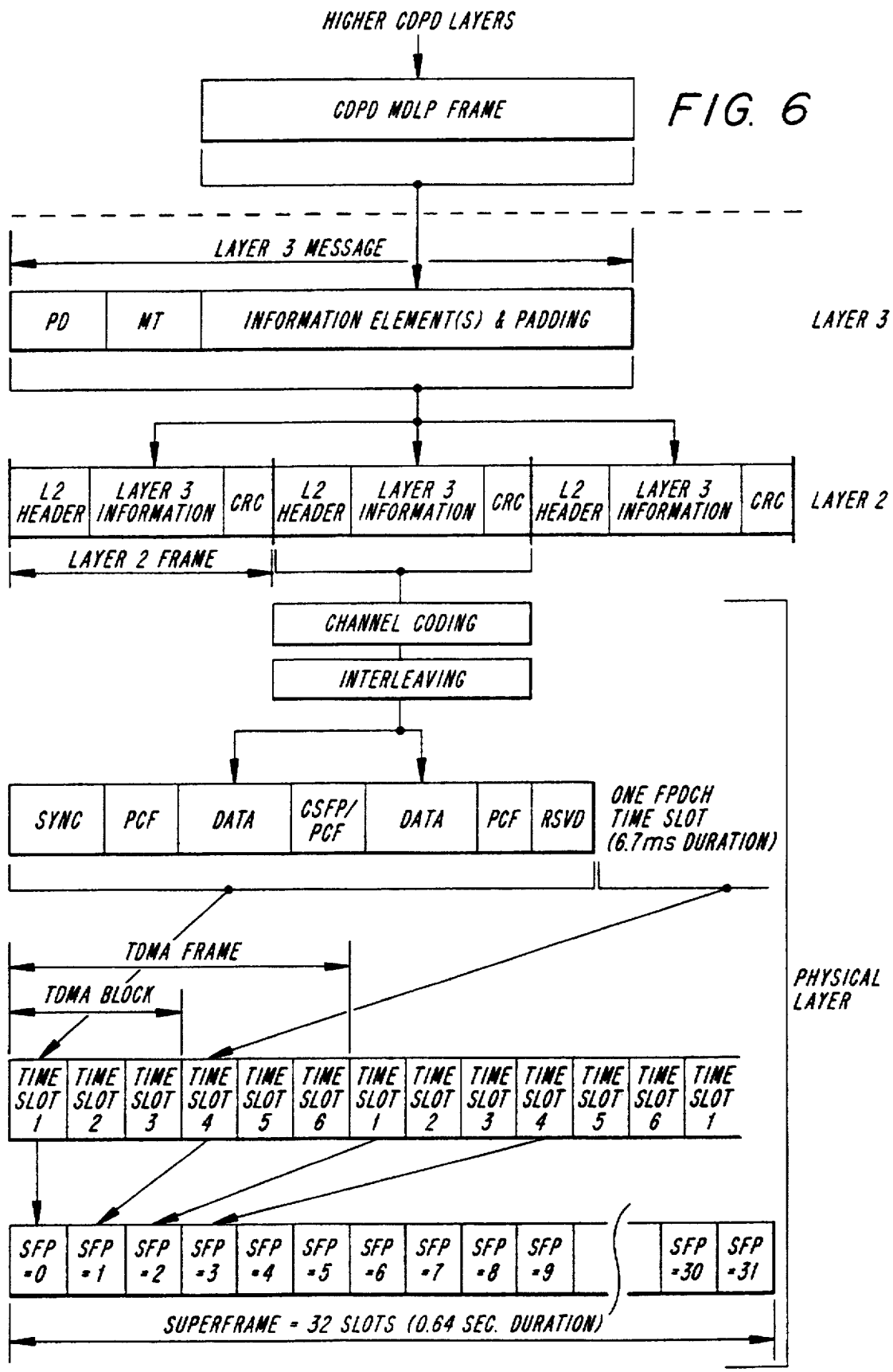
FIG. 6 illustrates one example of a possible mapping sequence.

To aid in the understanding of the present invention, a description for one possible mapping sequence is illustrated in FIG. 6. FIG. 6 shows a dedicated PDCH example of how one L3 message is mapped into several layer 2 frames, an example of a layer 2 frame mapping onto a time slot, and an example of time slot mapping onto a PDCH channel. The length of the FPDCH time slots and RPDCH bursts are fixed. There are three forms of RPDCH bursts which have different fixed lengths and the FPDCH slot and the full-rate PDCH are assumed to be on the physical layer in FIG. 6. In the present invention, the TDMA frame structure is the same as for IS-136 DCCH and DTC. In the interest of maximal throughput when a multi-rate channel is used (double rate PDCH and triple rate PDCH), an additional FPDCH slot format is specified. FIG. 7 illustrates the additional slot format which is provided by this invention. FIG. 7 illustrates a slot format for BMI→MS on PDCH. The difference between the slot format illustrated in FIG. 7 and the IS-136 DCCH BMI→MS slot format is that the PCF field is used in the present embodiment instead of SCF and the CSFP/PCF field in the present embodiment has replaced the CSFP field in the IS-136 DCCH format.

FIG. 7 illustrates the additional slot format which is provided by this invention. FIG. 7 illustrates a slot format for transmissions between the communication system and a mobile station on a packet data channel. In this embodiment, the slot format is divided into seven fields; a synchronization field (SYNC) for providing synchronization information to the mobile station, a packet channel feedback field (PCF), a first data (DATA) field, a coded superframe phase/packet channel feedback (CSFP/PCF) field, a second data field, a second packet channel feedback (PCF) field, and a reserved (RSVD) field.

The PCF field is used to control access on the RPDCH and includes busy/reserved/idle (BRI), received/not received (R/N), partial echo (PE) and partial echo qualifier (PEQ) information. The BRI, PE, and R/N data are as specified in IS-136 The CSFP/PCF field contains the additional PEQ data in the present embodiment. The CSFP/PCF field is used to convey information regarding the superframe phase SFP so that mobile stations can find the start of the superframe. Also, the CSFP/PCF field provides the PEQ information, which is used to dynamically assign the subchannels of the RPDCH so as to provide an efficient means for interrupting transmissions by a first mobile station so as to allow the communication system to send a short message to a different mobile station.

Figure 8:
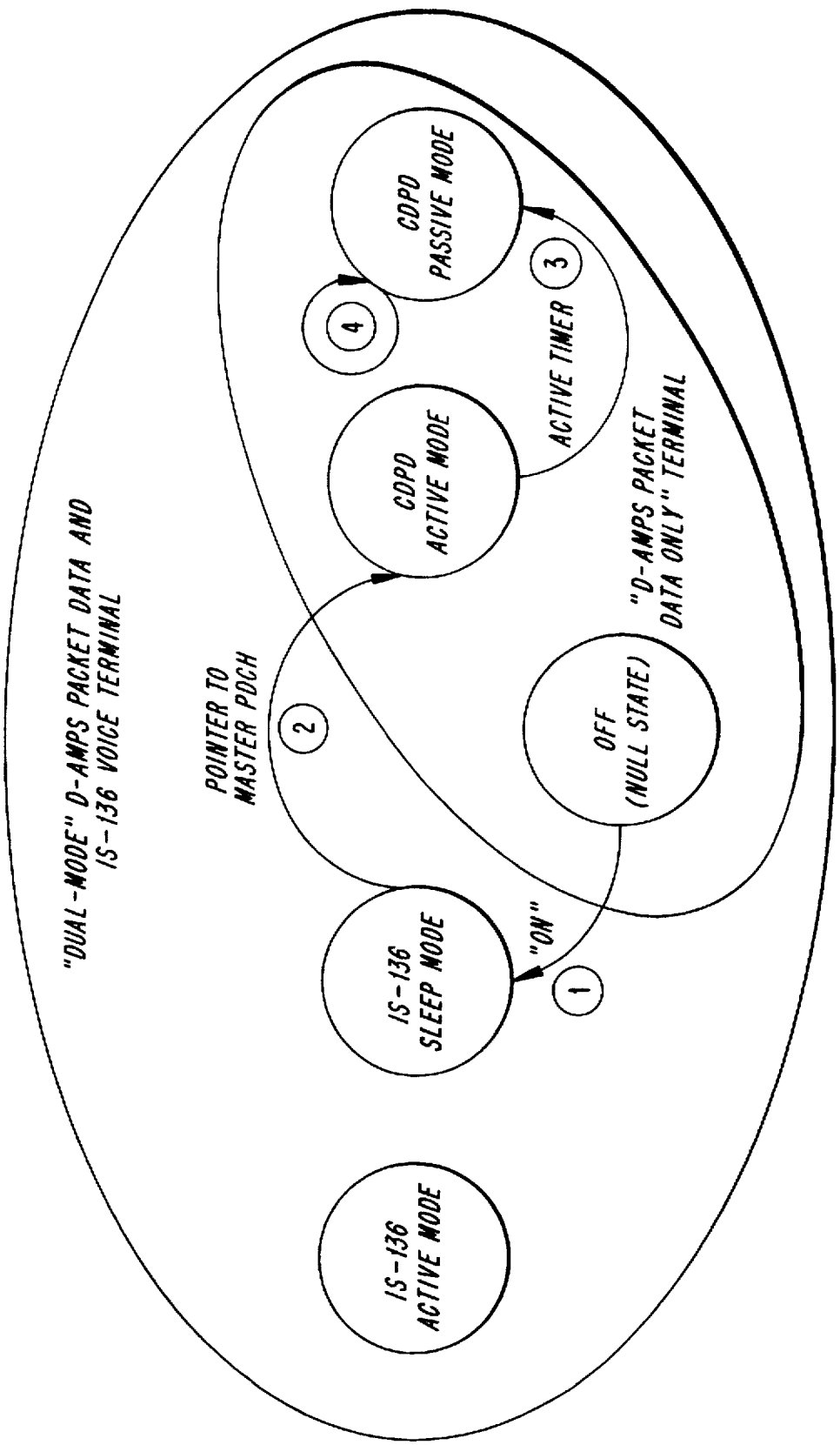
FIG. 8 illustrate a mobile station activating a CDPD mode of operation.

According to one embodiment of the present invention, the digital control channel (DCCH) of the IS-136 specification can be used to indicate packet data channel operation. In the present communication systems, different cells within the communication system have different digital control channels. When a mobile station powers on or enters the communication system, the mobile station will receive information about the system which is being broadcast on the DCCH. FIG. 8 illustrates an activation process for a mobile station at power-up. The mobile station first finds a DCCH. As will be explained below, the mobile station reads the BCCH to find a pointer to the beacon PDCH. Once the mobile station has locked onto the beacon PDCH, the mobile station enters an active mode and the mobile station registers with the communication system. The mobile station may be redirected to a different PDCH in response to the registration. The mobile station stays in an active mode on the indicated PDCH until an activity timer has expired. The mobile station then enters a passive mode.

Figure 9:
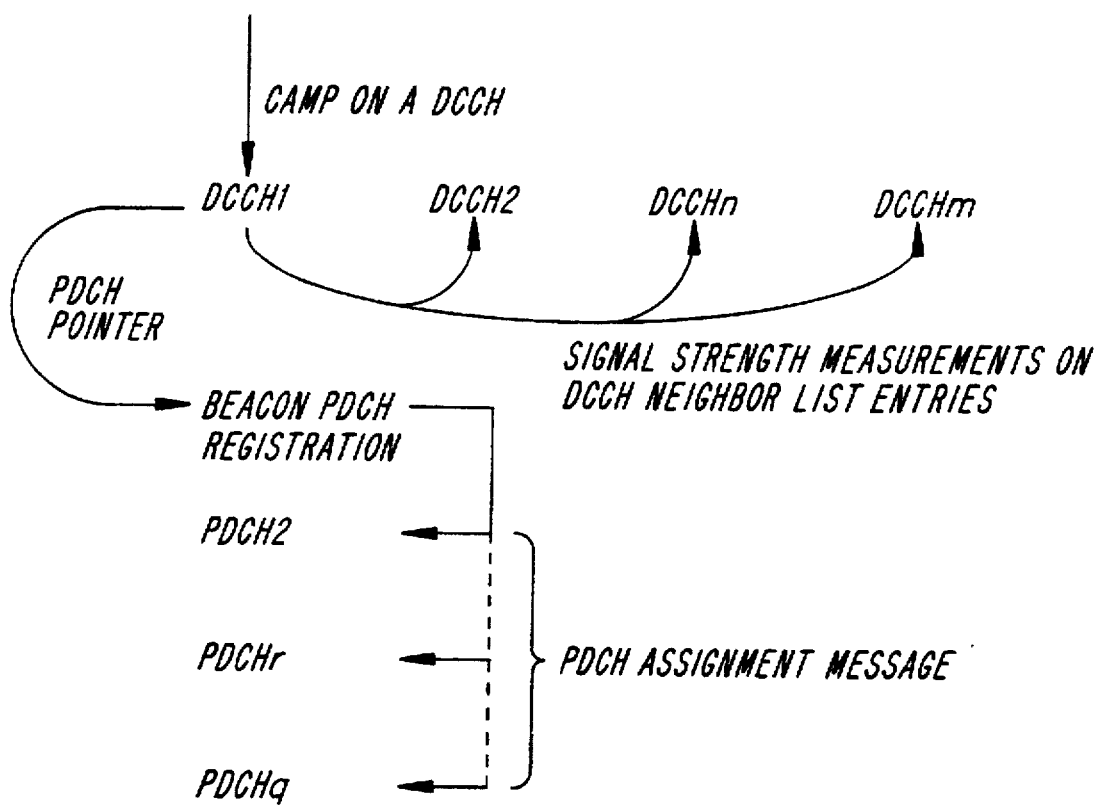
FIG. 9 illustrates a PDCH selection and cell reselection process according to one embodiment of the present invention.

FIG. 9 illustrates the relationship between packet data channels belonging to one cell or more specifically, having a common mother DCCH, and digital control channels in different cells. FIG. 9 illustrates a communication system with a plurality of digital control channels (DCCH1, DCCH2, ..., DCCHn, DCCHm). When a mobile station is activated or enters the communication system, the mobile station camps on one of the digital control channels, for example, DCCH1. While the mobile station is camped on the digital control channel, the system will send information to the mobile station such as a neighbor list, which lists m-1 frequencies of the digital control channels used by neighboring cells and whether this cell supports packet data channels. If the DCCH indicates support for one or more dedicated PDCHs, the carrier frequency of one PDCH, i.e., a beacon PDCH is provided. The mobile station is directed toward the beacon PDCH by a PDCH pointer. The mobile station registers itself on the beacon PDCH. The mobile station may continue to be assigned to the beacon PDCH or the mobile station may be assigned to another dedicated PDCH depending upon the communication system. For example, the digital control channel DCCH1 supports a plurality of packet data channels (Beacon PDCH, PDCH2, . . ., PDCHr, PDCHq). As a result, while the mobile station is first assigned to the beacon PDCH, the mobile station can be reassigned to another packet data channel. The mobile station may be reassigned for a variety of reasons, such as traffic control.

There are several benefits to having just one PDCH pointer per digital control channel. First of all, if each digital control channel were to have more than one pointer, extra bandwidth on each digital control channel would have to be provided for each additional pointer. In addition, reassigning mobile stations from the beacon PDCH allows the system to be more flexible than systems which must reassign mobile stations to new PDCHs from the DCCH. For example, a system with multiple pointers on each digital control channel can only assign the mobile stations to the packet data channels as a function of each mobile stations phone number or identification number (MSID). Thus, the assignment process would be static. However, according to the present invention, the beacon PDCH can perform individual reassignments based on a mobile station's past history or current request.

The mobile station performs cell reselection measurements by measuring the signal strengths of digital control channels of neighboring cells using the neighbor list acquired while initially camped on the digital control channel. According to one embodiment of the present invention, information on the PDCH indicates whether a neighboring DCCH supports packet data transmissions. Each packet data channel contains local PDCH information which indicates whether neighbor cells support packet data channels. Each packet data channel includes a vector, i.e., a bit map, having a length reflecting the length of the neighboring cell list. The vector may indicate which channels in the neighboring cell list support packet data channels. For example, a "1" in the first bit position in the bit map could indicate that the first cell in the neighbor list supports packet channels. It will be understood that the bit map is not limited to binary bits and could include multiple bits. In such a case, the multiple bits could also indicate other features of the neighboring cells, e.g., CDPD with original CDPD air interface. When a cell reselection takes place, the mobile station first camps on the new DCCH such as DCCH2. The mobile station is then directed to a beacon PDCH by a PDCH pointer specified for DCCH2. Likewise, the beacon PDCH can reassign the mobile station to another PDCH.

According to one embodiment of the present invention, the beacon may be the only PDCH channel which carries broadcast information. In this situation, when the broadcast information is changed, all of the mobile stations assigned to non-beacon packet data channels must be returned to the beacon PDCH so that the mobile stations can receive the new broadcast information. In the alternative, all of the PDCH channels may provide the broadcast information. In this situation, the broadcast information should be the same for all PDCH channels. Thus, if a mobile station reads broadcast information on one frequency, the mobile station can be assigned to another PDCH channel wherein the mobile station will not have to first reread the broadcast information.

According to another embodiment of this invention, the beacon PDCH may be the only PDCH which contains the broadcast information, the vector indicating which channels in the neighboring cell list support packet data channels, and other global common information. In this case, each mobile station will be given this information after the mobile station registers on the beacon PDCH.

It will be understood that Applicants' invention is not limited to the particular embodiments that have been described and illustrated. This application contemplates any and all modifications that fall within the spirit and scope of Applicants' invention as defined by the following claims.

What is claimed is:

1. A method for registering a mobile station when the mobile station first enters a communication system which supports packet data channels, comprising the steps of:

receiving at said mobile station system information broadcast on a digital control channel;

assigning said mobile station to a beacon packet data channel;

registering with said communication system over said beacon packet data channel.

2. A method according to claim 1, wherein said mobile station is assigned to the beacon packet data channel by a packet data channel pointer assigned to said digital control channel.

3. A method according to claim 1, further comprising the step of:

reassigning said mobile station from said beacon packet data channel to a second packet data channel.

4. A method according to claim 1, wherein said mobile station is reassigned based on past service requests.

5. A method according to claim 1, wherein said mobile station is reassigned based on current service requests.

6. A method according to claim 1, wherein said mobile station is reassigned based on past and current service requests.

7. A method according to claim 1, wherein said system information includes a neighbor list containing frequencies of other digital control channels used in neighboring cells.

8. A cell reselection method for a mobile station operating in a communication system which supports packet data channels, comprising the steps of:

receiving at said mobile station system information broadcast on a digital control channel;

assigning said mobile station to a beacon packet data channel;

registering with said communication system over said beacon packet data channel;

measuring signal strength of digital control channels of neighboring cells listed on a neighbor list included in said system information and said first digital control channel;

assigning said mobile station to a digital control channel of a neighboring cell when the signal strength of the neighboring digital control channel is higher than the signal strength of said first digital control channel.

9. A method according to claim 8, wherein said mobile station is assigned to the beacon packet data channel by a packet data channel pointer assigned to said digital control channel.

10. A method according to claim 8, further comprising the step of: reassigning said mobile station from said beacon packet data channel to a second packet data channel.

11. A method according to claim 8, wherein said mobile station is reassigned based on past service requests.

12. A method according to claim 8, wherein said mobile station is reassigned based on current service requests.

13. A method according to claim 8, wherein said mobile station is reassigned based on past and current service requests.

14. A method according to claim 8, wherein each packet data channel provides a mobile station local information.

15. A method according to claim 14, wherein said local information includes a bit map vector which indicates which of the neighboring cells supports packet data channels.

* * * * *